US012608603B2

(12) United States Patent
Kim et al.

(10) Patent No.: US 12,608,603 B2
(45) Date of Patent: Apr. 21, 2026

(54) GENERATIVE ADVERSARIAL NETWORK MODEL AND TRAINING METHOD TO GENERATE MESSAGE ID SEQUENCE ON UNMANNED MOVING OBJECTS

(71) Applicant: Korea University Research and Business Foundation, Seoul (KR)

(72) Inventors: Huy Kang Kim, Seoul (KR); Jeong Do Yoo, Seoul (KR); Seonghoon Jeong, Seoul (KR); Eunji Park, Seoul (KR); Kang Uk Seo, Seoul (KR); Minsoo Ryu, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 1186 days.

(21) Appl. No.: 17/532,226

(22) Filed: Nov. 22, 2021

(65) Prior Publication Data

US 2022/0164656 A1 May 26, 2022

(30) Foreign Application Priority Data

Nov. 24, 2020 (KR) ........................ 10-2020-0158746
Jan. 22, 2021 (KR) ........................ 10-2021-0009487

(51) Int. Cl.
*G06N 3/08* (2023.01)
*G06N 3/045* (2023.01)
(52) U.S. Cl.
CPC ............... *G06N 3/08* (2013.01); *G06N 3/045* (2023.01)
(58) Field of Classification Search
CPC .......................................................... G06N 3/08
See application file for complete search history.

(56) References Cited

U.S. PATENT DOCUMENTS

2009/0195401 A1* 8/2009 Maroney ................ G06V 20/52
340/686.6
2013/0163548 A1* 6/2013 Nagai .............. G08G 1/096775
370/329
(Continued)

FOREIGN PATENT DOCUMENTS

CN 110310345 A * 10/2019 ........... G06T 11/001
CN 111031051 A * 4/2020 ............. G06N 3/045
JP 5349193 B2 * 11/2013

OTHER PUBLICATIONS

"PAC-GAN: Packet Generation of Network Traffic using Generative Adversarial Networks", https://ieeexplore.ieee.org/stamp/stamp.jsp?tp=&arnumber=8936224, Adriel Cheng, Dec. 19, 2019 (Year: 2019).*

(Continued)

*Primary Examiner* — Kamran Afshar
(74) *Attorney, Agent, or Firm* — NSIP Law

(57) ABSTRACT

Disclosed is a method for training an anomaly detection model of an unmanned moving object utilizing a message ID sequence, which includes: collecting packet data generated from the unmanned moving object; pre-processing the collected packet data; generating converted data for a message ID sequence of the packet data by inputting the preprocessed packet data into a language model; generating similar data similar to the message ID sequence of the packet data by inputting the preprocessed packet data into a first neural network model; training and evaluating the first neural network model by inputting the converted data of the language model and the similar data of the first neural network model into a training model; and predicting and training a symptom of the unmanned moving object by inputting the preprocessed packet data and the similar data of the first neural network model into a second neural network model.

14 Claims, 10 Drawing Sheets

(56)  References Cited

U.S. PATENT DOCUMENTS

| | | | |
|---|---|---|---|
| 2018/0101770 A1* | 4/2018 | Tanaka | G06N 3/047 |
| 2020/0336450 A1* | 10/2020 | Gao | H04L 51/214 |

OTHER PUBLICATIONS

"An Adaptive Control Algorithm for Stable Training of Generative Adversarial Networks", https://ieeexplore.ieee.org/stamp/stamp.jsp?tp=&arnumber=8936350&tag=1, XiaoHan Ma, Dec. 18, 2019 (Year: 2019).*

* cited by examiner

710

PROGRESS DIRECTION

GENERATIVE ADVERSARIAL NETWORK MODEL AND TRAINING METHOD TO GENERATE MESSAGE ID SEQUENCE ON UNMANNED MOVING OBJECTS

CROSS-REFERENCE TO RELATED APPLICATIONS

This application claims priority to and the benefit of Korean Patent Application No. 10-2020-0158746 filed on Nov. 24, 2020 and Korean Patent Application No. 10-2021-0009487 filed on Jan. 22, 2021 in the Korean Intellectual Property Office, the entire contents of which are incorporated herein by reference.

TECHNICAL FIELD

The present disclosure relates to a method for enhancing the performance of an anomaly detection system through the generation of learning data as a deep learning model using an adversarial training method for an unmanned moving object.

BACKGROUND ART

In general, an unmanned moving object refers to an airframe that performs a specific mission by autonomously judging a current situation in a state in which intervention of a person is minimized, such as a drone, an autonomous vehicle, etc. Today, while unmanned moving object technology is developed, the unmanned moving object is used in various fields including a parcel service, driving, local surveillance, military weapons, etc. Since the intervention of the person is little, when a symptom is detected in the unmanned moving object, there are many cases in which the persons cannot immediately respond to the symptom. Accordingly, when a symptom detection system detects the symptom, the symptom detection system needs to notify the symptom to the person. The symptom may be detected by using a deep learning model.

In order to train the deep learning model, it is normal to change the structure and a hyperparameter of the deep learning model. Nevertheless, there may be no sufficient performance enhancement. In this case, it may be a cause that the number of training data of the deep learning model is small or the training data are not evenly distributed, and as a result, the deep learning model takes only biased information.

In order to further enhance a model performance, a lot of training data should be secured.

There may be several methods for data securing as an example. First, there is a geometric conversion of data. Rotation, inversion, parallel movement, etc., are applied to image data to increase the amount of data. However, such a method has a disadvantage in that such a method may be applied only to data which belongs to a specific domain, such as an image. A second method is to additionally secure actual data.

However, there is a problem in that a lot of cost is required for securing a lot of data for training. In order to solve a cost problem required for data securing, it is necessary to introduce another deep learning model that generates data.

SUMMARY OF THE INVENTION

The present disclosure is contrived in response to the above-described background, and has been made in an effort to provide a data generation deep learning model for enhancing a performance a symptom detection model in an unmanned moving object, and a method to train the model.

In order to achieve the object, disclosed are a generative adversarial neural network model and a training method to generate message ID sequence on unmanned moving objects.

An exemplary embodiment of the present disclosure provides a method for training an anomaly detection model of unmanned moving object, which includes: collecting packet data generated from the unmanned moving object; pre-processing the collected packet data; generating converted data for a message ID sequence of the packet data by inputting the pre-processed packet data to a language model; generating similar data similar to the message ID sequence of the packet data by inputting the pre-processed packet data to a first neural network model; training and evaluating the first neural network model by inputting the converted data of the language model and the similar data of the first neural network model to a training model; and training a second neural network model in a way of predicting a symptom of the unmanned moving object by inputting the pre-processed packet data and the similar data of the first neural network model to the second neural network model.

In an alternative exemplary embodiment of the method for training an anomaly detection model of unmanned moving object, the pre-processing of the collected packet data includes: extracting a message ID from the collected packet data; assigning an integer value to the extracted message ID; and normalizing the integer value assigned to the message ID.

In an alternative exemplary embodiment of the method for training an anomaly detection model of unmanned moving object, the assigning an integer value to the extracted message ID includes assigning a different integer value according to a type of the message ID.

In an alternative exemplary embodiment of the method for training an anomaly detection model of unmanned moving object, the normalizing the integer value assigned to the message ID includes normalizing the integer value assigned to the message ID to a range of 0 to 1 in order to scale a size of the message ID.

In an alternative exemplary embodiment of the method for training an anomaly detection model of unmanned moving object, the generating of the converted data includes dividing the message ID sequence of the packet data into N units, and generating the converted data for the message ID sequence by sequentially performing an N-gram calculation for the divided sequence.

In an alternative exemplary embodiment of the method for training an anomaly detection model of unmanned moving object, the language model includes a message ID N-gram model.

In an alternative exemplary embodiment of the method for training an anomaly detection model of unmanned moving object, the generating similar data includes:

generating a similar message ID sequence similar to the message ID sequence of the packet data by inputting a random noise vector to a generator of the first neural network model:

training to discriminate between an actual message ID sequence and the similar message ID sequence by inputting the actual message ID sequence of the pre-processed packet data and the generated similar message ID sequence to a discriminator of the first neural network model; and training the generator by inputting determination result to the generator of the first neural network model.

In an alternative exemplary embodiment of the method for training an anomaly detection model of unmanned moving object, the first neural network model includes a generative adversarial network (GAN) model.

In an alternative exemplary embodiment of the method for training an anomaly detection model of unmanned moving object, the training and evaluating the first neural network model includes: evaluating the first neural network model by inputting the converted data of the language model and the similar data of the first neural network model in a training model; and training the first neural network model based on evaluation result.

In an alternative exemplary embodiment of the method for training an anomaly detection model of unmanned moving object, the training the first neural network model includes training the discriminator and the generator of the first neural network model individually, and then training both the discriminator and the generator to adjust a training ratio.

In an alternative exemplary embodiment of the method for training an anomaly detection model of unmanned moving object, the training the first neural network model includes a first training process of training only the discriminator M times, a second training process of training only the generator N times, and a third training process of training the discriminator and the generator O times, and orders and the numbers of times of the first training process, the second training process, and the third training processes are varied based on a loss function of the generator.

In an alternative exemplary embodiment of the method for training an anomaly detection model of unmanned moving object, the training the first neural network model includes: training the discriminator of the first neural network model M times; training the generator of the first neural network model N times; and training the discriminator and the generator of the first neural network model O times.

In an alternative exemplary embodiment of the method for training an anomaly detection model of unmanned moving object, the training a second neural network model in a way of predicting a symptom of the unmanned moving object includes: pre-processing normal packet data generated in a normal communication state of the unmanned moving object; and training the second neural network model in a way of predicting a message ID following a current message ID sequence of the normal packet data by inputting the pre-processed normal packet data to the neural network model.

In an alternative exemplary embodiment of the method for training an anomaly detection model of unmanned moving object, the predicting and training of the symptom of the unmanned moving object may include pre-processing normal packet data which the unmanned moving object generates in a normal communication state, and predicting and training a message ID following a current message ID sequence of the normal packet data by inputting the preprocessed normal packet data into the second neural network model.

In an alternative exemplary embodiment of the method for training an anomaly detection model of unmanned moving object, the second neural network model may have a hierarchical structure including a 1D convolutional layer, a gated recurrent units (GRU) layer, and a dense layer.

In an alternative exemplary embodiment of the method for training an anomaly detection model of unmanned moving object, the second neural network model may predict a message ID following the current message ID sequence of the packet data when the preprocessed packet data is input, calculate a message ID pattern prediction success rate by comparing the predicted message ID and an actual message ID, and detect the symptom of the unmanned moving object based on the calculated message ID pattern prediction success rate.

Another exemplary embodiment of the present disclosure provides a computer program stored in a computer-readable storage medium, in which the computer program executes the following operations for training an anomaly detection model of an unmanned moving object when the computer program is executed by one or more processors and the operations may include: collecting packet data generated from the unmanned moving object; pre-processing the collected packet data; generating converted data for a message ID sequence of the packet data by inputting the preprocessed packet data into a language model; generating similar data similar to the message ID sequence of the packet data by inputting the preprocessed packet data into a first neural network model; training and evaluating the first neural network model by inputting the converted data of the language model and the similar data of the first neural network model into a training model; and predicting and training a symptom of the unmanned moving object by inputting the preprocessed packet data and the similar data of the first neural network model into a second neural network model.

Still another exemplary embodiment of the present disclosure provides a computing device for providing a method for training an anomaly detection model of unmanned moving object, which may include: a processor including one or more cores; and a memory, in which the processor may be configured to collect packet data generated from the unmanned moving object, preprocess the collected packet data, generate converted data for a message ID sequence of the packet data by inputting the preprocessed packet data into a language model, generate similar data similar to the message ID sequence of the packet data by inputting the preprocessed packet data into a first neural network model, train and evaluate the first neural network model by inputting the converted data of the language model and the similar data of the first neural network model into a training model, and predict and train a symptom of the unmanned moving object by inputting the preprocessed packet data and the similar data of the first neural network model into a second neural network model.

Technical solving means which can be obtained in the present disclosure are not limited to the aforementioned solving means and other unmentioned solving means will be clearly understood by those skilled in the art from the following description.

According to an exemplary embodiment of the present disclosure, data having various patterns is generated in addition to a data pattern shown in a message ID sequence and the generated data is used for training to enhance a performance of an anomaly detection model in an unmanned moving object.

Effects which can be obtained in the present disclosure are not limited to the aforementioned effects and other unmentioned effects will be clearly understood by those skilled in the art from the following description.

BRIEF DESCRIPTION OF THE DRAWINGS

Some of the exemplary embodiments are illustrated in the accompanying drawings so as to appreciate features of the mentioned disclosed contents with reference to the following embodiments through the detailed and more concrete description. Further, it is intended that reference numerals in the drawing denote the same or similar function throughout several aspects. However, the accompanying drawings just illustrate only specific typical embodiments of the disclosed contents and are not considered to limit the scope of the present disclosure and it should be noted that other embodiments having the same effect can be sufficiently recognized.

DETAILED DESCRIPTION

Figure 1:
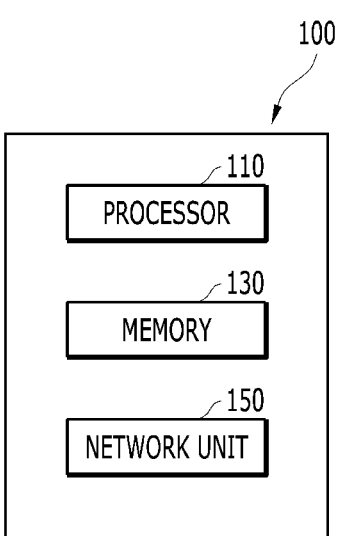
FIG. 1 is a block diagram of a computing device performing an operation for providing a method for training an anomaly detection model on unmanned moving objects according to an exemplary embodiment of the present disclosure.

Various exemplary embodiments will now be described with reference to drawings. In the present specification, various descriptions are presented to provide an appreciation of the present disclosure. However, it is apparent that the exemplary embodiments can be executed without a specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a server and the server may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

Contents for carrying out an adversarial training method in order to reinforce anomaly detection on unmanned moving objects using a message ID sequence will be described. Contents of an unmanned aircraft which belongs to an unmanned moving object may be described as an exemplary embodiment and are not limited to the unmanned aircraft, but even any device which belongs to the unmanned moving object may be adopted.

FIG. 1 is a block diagram of a computing device performing an operation for providing a method for training an anomaly detection model on unmanned moving objects according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

In the present disclosure, the processor 110 may detect the symptom of the unmanned moving object by utilizing a message ID sequence.
According to an exemplary embodiment of the present disclosure, the processor 110 generates data having a data pattern shown in the message ID sequence and various other patterns, and uses the generated data for training to enhance a performance of an anomaly detection model.

According to an exemplary embodiment of the present disclosure, the processor 110 collects packet data generated from the unmanned moving object, preprocesses the collected packet data, generates converted data for the message ID sequence of the packet data by inputting the preprocessed packet data into a language model, generates similar data similar to the message ID sequence of the packet data by inputting the preprocessed packet data into a first neural network model, trains and evaluates the first neural network model by inputting the converted data of the language model and the similar data of the first neural network model into a training model, and predict and train the symptom of the unmanned moving object by inputting the preprocessed packet data and the similar data of the first neural network model into the second neural network model.

According to an exemplary embodiment of the present disclosure, the processor 110 may collect the packet data generated from the unmanned moving object through communication between the unmanned moving object and a ground control system (GCS) when collecting the packet data. For example, the unmanned moving object and a ground control system (GCS) may perform the communication by using a Micro Air Vehicle (MAV) Link protocol. The above-described matter is just an example and the present disclosure is not limited thereto.

According to an exemplary embodiment of the present disclosure, the processor 110 may extract a message ID from the collected packet data, assign an integer value to the extracted message ID, and normalize the integer value assigned to the message ID, when pre-processing the collected packet data.

According to an exemplary embodiment of the present disclosure, the processor 110 may extract only the message ID from the collected packet data when extracting the message ID. Here, the extracted message ID may include an identifier for determining the type of message transmitted and received in a protocol which the unmanned moving object uses for the communication. The above-described matter is just an example and the present disclosure is not limited thereto.

According to an exemplary embodiment of the present disclosure, the processor 110 may assign the same integer value to the same message ID and assign different integer values to different message IDs, respectively, when assigning the integer value to the extracted message ID. The processor 110 may assign different integer values according to the type of message ID when assigning the integer value to the extracted message ID. For example, when assigning the integer value to the extracted message ID, the processor 110 may assign any one integer among 1 to N to each message ID when the total number of types of message ID is N. The above-described matter is just an example and the present disclosure is not limited thereto.

According to an exemplary embodiment of the present disclosure, the processor 110 may normalize the integer value assigned to the message ID to scale the message ID to a range of 0 to 1, when normalizing the integer value assigned to the message ID. For example, when the total number of types of message ID is n, the processor 110 may normalize the integer value assigned to the message ID to a result value calculated by dividing the integer value assigned to each message ID by n. The above-described matter is just an example and the present disclosure is not limited thereto.

According to an exemplary embodiment of the present disclosure, when generating the converted data, the processor 110 divides the message ID sequence of the packet data into N units and sequentially performs an N-gram calculation for the divided sequence to generate the converted data for the message ID sequence. When the processor 110 generates the converted data, the language model may include a message ID N-gram model, and the processor 110 divides the message ID sequence of the packet data into N units through the message ID N-gram model and models the divided message ID sequences statistically and probabilistically to generate the converted data for the message ID sequence. For example, the language model may be the message ID N-gram model. The above-described matter is just an example and the present disclosure is not limited thereto.

According to an exemplary embodiment of the present disclosure, when generating the similar data, the processor 110 may generate a similar message ID sequence similar to the message ID sequence of the packet data by inputting a random noise vector into a generator of the first neural network model, train a discriminator so as to determine an actual message ID sequence and a similar message ID sequence by inputting the actual message ID sequence of the preprocessed packet data and the generated similar message ID sequence into the discriminator of the first neural network model, and train the generator by inputting a determination result into the generator of the first neural network model. As an example, the first neural network model may include a generative adversarial network (GAN) model. The above-described matter is just an example and the present disclosure is not limited thereto.

According to an exemplary embodiment of the present disclosure, the processor 110 may evaluate the first neural network model by inputting the converted data of the language model and the similar data of the first neural network model into the training model, and train the first neural network model based on an evaluation result, when training and evaluating the first neural network model. Here, the first neural network model and the training model may alternately perform the operations.

According to an exemplary embodiment of the present disclosure, the processor 110 may individually train the discriminator and the generator of the first neural network model, and then adjust a training ratio by training both the discriminator and the generator, when training the first neural network model. The processor 110 may include a first training process of training only the discriminator M times, a second training process of training only the generator N times, and a third training process of training the discriminator and the generator O times, when training the first neural network model, and an order and the number of times of the first, second, and third training processes may be varied based on a loss function of the generator. For example, the processor 110 may train the discriminator of the first neural network model M times, train the generator of the first neural network model N times, and train the discriminator and the generator of the first neural network model O times, when training the first neural network model. The above-described matter is just an example and the present disclosure is not limited thereto.

According to an exemplary embodiment of the present disclosure, the processor 110 may preprocess normal packet data generated when the unmanned moving object is in a normal communication state, and predict and train a message ID following a current message ID sequence of the normal packet data by inputting the preprocessed normal packet data into the second neural network model, when predicting and training the symptom of the unmanned moving object. As an example, the second neural network model may include a hierarchical structure including a 1D convolutional layer, a gated recurrent units (GRU) layer, and a dense layer. The above-described matter is just an example and the present disclosure is not limited thereto.

According to an exemplary embodiment of the present disclosure, the processor 110 may input the preprocessed packet data into the pre-trained second neural network model, predict a message ID following the current message ID sequence of the packet data input into the second neural network model, calculate a message ID pattern prediction success rate by comparing the predicted message ID and an actual message ID, and detect the symptom of the unmanned moving object based on the calculated message ID pattern prediction success rate, when detecting the symptom of the unmanned moving object.

According to an exemplary embodiment of the present disclosure, the processor 110 may calculate an average value for message ID pattern prediction success rates for a predetermined time when the message ID pattern prediction success rate is calculated at the time of calculating the message ID pattern prediction success rate, and detect the symptom of the unmanned moving object by comparing the calculated average value for the message ID pattern prediction success rates and a predetermined threshold. Here, when detecting the symptom of the unmanned moving object, the processor 110 may determine that the symptom of the unmanned moving object is detected when the calculated average value for the message ID pattern prediction success rates is smaller than the threshold. As an example, the threshold may be varied according to the structure of the neural network model or an application environment of the neural network model, and determined through an experiment. The above-described matter is just an example and the present disclosure is not limited thereto.

According to an exemplary embodiment of the present disclosure, the processor 110 may input the preprocessed packet data into the pre-trained second neural network model, predict a message ID following the current message ID sequence of the packet data input into the second neural network model, calculate a message ID pattern loss value by comparing the predicted message ID and an actual message ID, and detect the symptom of the unmanned moving object based on the calculated message ID pattern loss value, when detecting the symptom of the unmanned moving object.

According to an exemplary embodiment of the present disclosure, the processor 110 may calculate an average value for message ID pattern loss values for a predetermined time when the message ID pattern loss value is calculated at the time of calculating the message ID pattern loss value, and detect the symptom of the unmanned moving object by comparing the calculated average value for the message ID pattern loss values and a predetermined threshold. Here, when detecting the symptom of the unmanned moving object, the processor 110 may determine that the symptom of the unmanned moving object is detected when the calculated average value for the message ID pattern loss values is larger than the threshold. As an example, the threshold may be varied according to the structure of the neural network model or an application environment of the neural network model, and determined through an experiment. Further, the average value for the message ID pattern loss values for the predetermined time may be calculated by an equation configured by an average of loss values for N frames=$(\text{Loss}_T + \text{Loss}_{T-1} + \ldots \text{Loss}_{T-N+1})/N$. The above-described matter is just an example and the present disclosure is not limited thereto.

As described above, the processor 110 may be constituted by one or more cores and may include processors for deep learning, which include a central processing unit (CPU), a general-purpose graphics processing unit (GPGPU), a tensor processing unit (TPU), and the like of the computing device 100. The processor 110 may read a computer program stored in the memory 130 to detect a symptom of an unmanned moving object according to an exemplary embodiment of the present disclosure. According to an exemplary embodiment of the present disclosure, the processor 110 may perform an operation for detecting the symptom of the unmanned moving object. The processor 110 may perform calculations for learning the neural network, which include processing of input data for learning in deep learning (DL), extracting a feature in the input data, calculating an error, updating the weight of the neural network using backpropagation, and the like. At least one of the CPU, GPGPU, and TPU of the processor 110 may process training of a network function. For example, both the CPU and the GPGPU may process the training of the network function, and detection of the symptom of the unmanned moving object using the network function. Further, in an exemplary embodiment of the present disclosure, processors of a plurality of computing devices are being used together to process the training of the network function, and the detection of the symptom of the unmanned moving object using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 or any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

According to an exemplary embodiment of the present disclosure, the network unit 150 may transmit and receive data for performing the detection of the symptom of the unmanned moving object to and from other computing devices, servers, and the like. The network unit 150 may transmit and receive data for performing the detection of the symptom of the unmanned moving object to and from other computing devices, servers, and the like. In addition, the network unit 150 may enable communication among a plurality of computing devices so that training of the network function is distributively performed in each of the plurality of computing devices. The network unit 150 enables communication among a plurality of computing devices to distribute and process the generation of analysis data using the network function.

According to an exemplary embodiment of the present disclosure, the network unit 150 may be configured regardless of communication modes such as wired and wireless modes and constituted by various communication networks including a personal area network (PAN), a wide area network (WAN), and the like. Further, the network unit 150 may be known as World Wide Web (WWW) and may adopt a wireless transmission technology used for short-distance communication, such as infrared data association (IrDA) or Bluetooth. The techniques described in this specification may also be used in other networks in addition to the aforementioned networks.

As described above, according to the present disclosure, data having a data pattern shown in the message ID sequence and various other patterns is generated, and the generated data is used for training to enhance a performance of an anomaly detection model.

Figure 2:
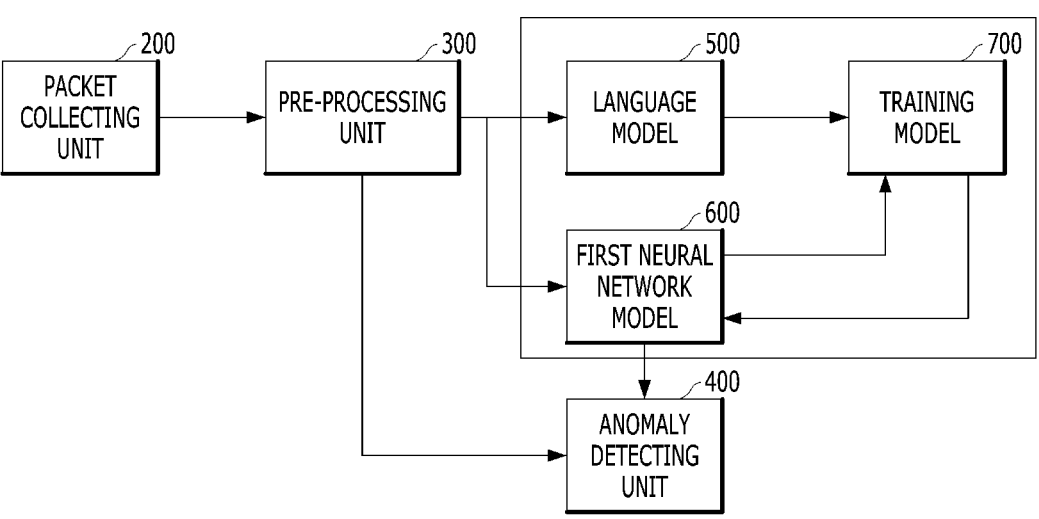
FIG. 2 is a block diagram of a processor for describing a method for training an anomaly detection model on unmanned moving objects according to an exemplary embodiment of the present disclosure.

FIG. 2 is a block diagram of a processor for describing a method for training an anomaly detection model on unmanned moving objects according to an exemplary embodiment of the present disclosure.

As illustrated in FIG. 2, the processor according to the present disclosure may include a packet collecting unit 200, a pre-processing unit 300, an anomaly detecting unit 400 including a second neural network model, a language model 500, a first neural network model 600, and a training model 700.

The packet collecting unit 200 may collect a packet generated from the unmanned moving object. For example, a ground control system (GCS) may be utilized in order to collect the packet generated from the unmanned aircraft, and in this case, the GCS may become the packet collecting unit 200.

In addition, the pre-processing unit 300 may extract a message ID from the collected packet so as to be used by the deep learning model. Here, the message ID may be an identifier for determining the type of message transmitted and received in a protocol which the unmanned moving object uses for the communication. For example, a communication protocol widely used in the unmanned aircraft may include a MAVLink protocol, etc. The message ID may be included in a protocol format as illustrated in FIG. 3.

Figure 3:
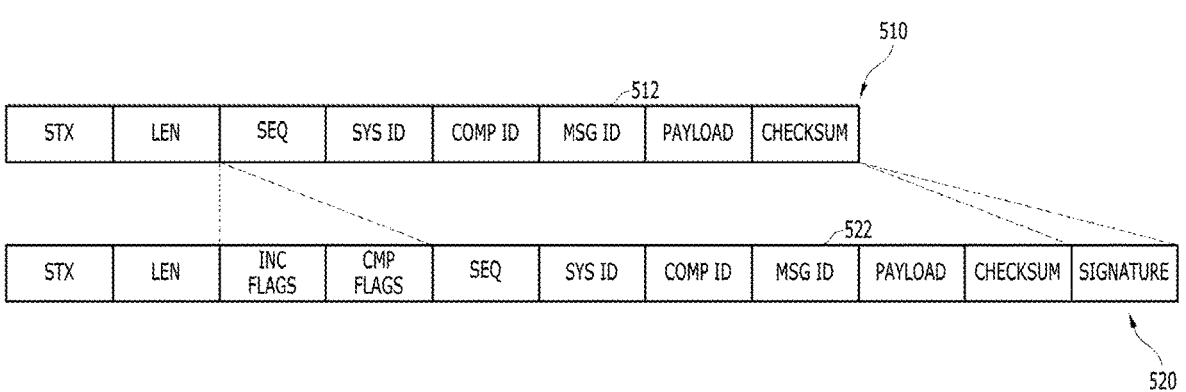
FIG. 3 is a diagram illustrating packet data including a message ID according to an exemplary embodiment of the present disclosure.

FIG. 3 is a diagram illustrating packet data including the message ID according to an exemplary embodiment of the present disclosure, and as illustrated in FIG. 3, the communication protocol used in the unmanned aircraft may be the MAVLink protocol and packet data 510 transmitted and received in a MAVLink 1 protocol which is version 1 may include a message ID 512 and packet data 520 transmitted and received in a MAVLink 2 protocol which is version 2 may include a message ID 522. Here, the message ID may be an identifier for determining the type of message transmitted and received in a protocol which the unmanned moving object uses for the communication.

Next, the pre-processing unit 300 may preprocess the extracted message ID. In this case, a pre-processing scheme may vary depending on the used deep learning model. Data output from the pre-processing unit 300 may be a preprocessed message ID sequence.

Figure 4:
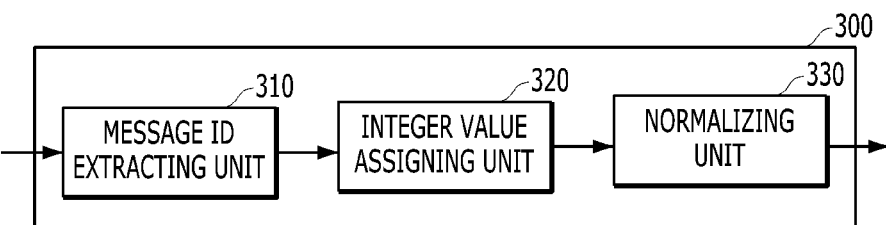
FIG. 4 is a block diagram for describing a pre-processing unit according to an exemplary embodiment of the present disclosure.

FIG. 4 is a block diagram for describing a pre-processing unit according to an exemplary embodiment of the present disclosure.

As illustrated in FIG. 4, the pre-processing unit 300 may include a message ID extracting unit 310, an integer value assigning unit 320, and a normalizing unit 330.

The message ID extracting unit 310 may extract the message ID from a protocol packet used by the unmanned moving object.

The integer value assigning unit 320 may assign a new integer value to the extracted message ID. For example, in the MAVLink 2 protocol, if the message ID is 0x00008D, the message ID may represent a packet containing altitude information of the unmanned aircraft and if the message ID is 0x000000, the message ID may represent a heartbeat packet for confirming whether the unmanned aircraft or the GCS normally communicate with each other. The message ID which is 0x00008D is assigned with an integer of 1 to be all converted into 1 and the message ID which is 0x000000 is all assigned with an integer of 2 to be all converted into 2. A reason for converting into another integer as such is to easily use the deep learning model through normalization. As an exemplary embodiment, the integer value assigning unit 320 may assign the same integer value to the same message ID and assign different integer values to different message IDs, respectively. Further, the integer value assigning unit 320 may also assign different integer values according to the type of message ID. For example, when assigning the integer value to the extracted message ID, the processor 110 may assign any one integer among 1 to N to each message ID when the total number of types of message ID is N.

The normalizing unit 330 may scale a message ID converted into a new integer. For example, if the integer assigned by the integer value assigning unit 320 is 1 to 24, i.e., the number of types of message ID is 24, each integer value may be divided by 24. The message ID converted into the integer of 1 may finally have a value of $1/24$ and a message ID converted into an integer of 24 may finally have a value of 1.

As an exemplary embodiment, the normalizing unit 330 may normalize the integer value assigned to the message ID to a range of 0 to 1 in order to scale the message ID. For example, when the total number of types of message ID is n, the normalizing unit 330 may normalize the integer value assigned to the message ID to a result value calculated by dividing the integer value assigned to each message ID by n.

Subsequently, the language model 500 as a message ID N-gram model may generate an N-gram model by receiving data of which pre-processing in the pre-processing unit 300 is completed. The N-gram model as one of the language models used in computer linguistics is represented by cutting, when there is a character sequence or a character string sequence, the character sequence or the character string sequence into n and modeling the cut sequences statistically and probabilistically. For example, when there is a word 'text', if each two is cut in units of alphabets, the word may be represented by 'te', 'ex', and 'xt'. In the present disclosure, each message ID may be treated as the alphabet or word used in computer linguistics to thereby generate the N-gram model for the message ID.

Figure 5:
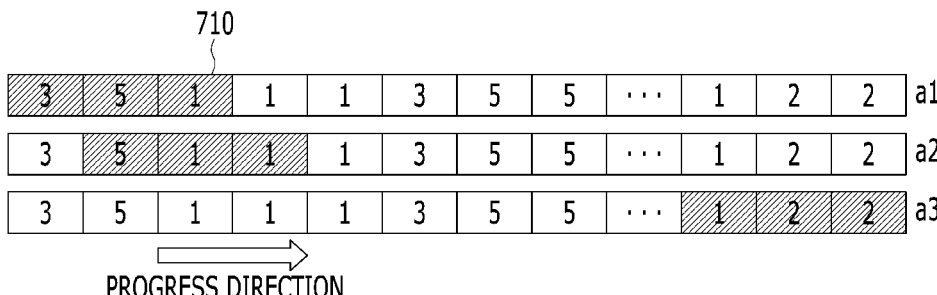
FIG. 5 is a diagram for describing a process of generating an N-gram model of a language model according to an exemplary embodiment of the present disclosure.

FIG. 5 is a diagram for describing an N-gram model generating process of the language model according to an exemplary embodiment of the present disclosure, and FIG. 5 illustrates an example of 3-gram (trigram) and the model may operate by the same scheme even for another n-gram. The language model slides a window 710 having a size of 3 toward a rear from a front of the sequence in order to calculate the 3-gram when the message ID sequence is given. When the window 710 is located as in a1, message IDs which enter the window 710 are 3, 5, and 1 in order. The corresponding 3-gram (3, 5, 1) is recorded in the N-gram model, and then the window 710 moves in one space. When the window 710 is located as in a2, message IDs which enter the window 710 are 5, 1, and 1 in order. The corresponding 3-gram (5, 1, 1) is recorded in the N-gram model, and then the window 710 moves in one space. When this process is repeated and reaches the last of the sequence as in a3 and the last 3-gram is recorded, 3-gram calculation ends.

Next, the first neural network model 600 as a generative adversarial neural network model may generate new data by training the data of which pre-processing in the pre-processing unit 300 is completed. The first neural network model 600 shows the structure a generative adversarial network (GAN) in a deep learning field. That is, the first neural network model 600 is constituted by a generator and a discriminator and is trained while competing with each other, and in this case, a detailed network hierarchical structure of the generator and the discriminator may not be fixed, but changed. The generated data may be sequence data similar to the preprocessed message ID sequence.

Figure 6:
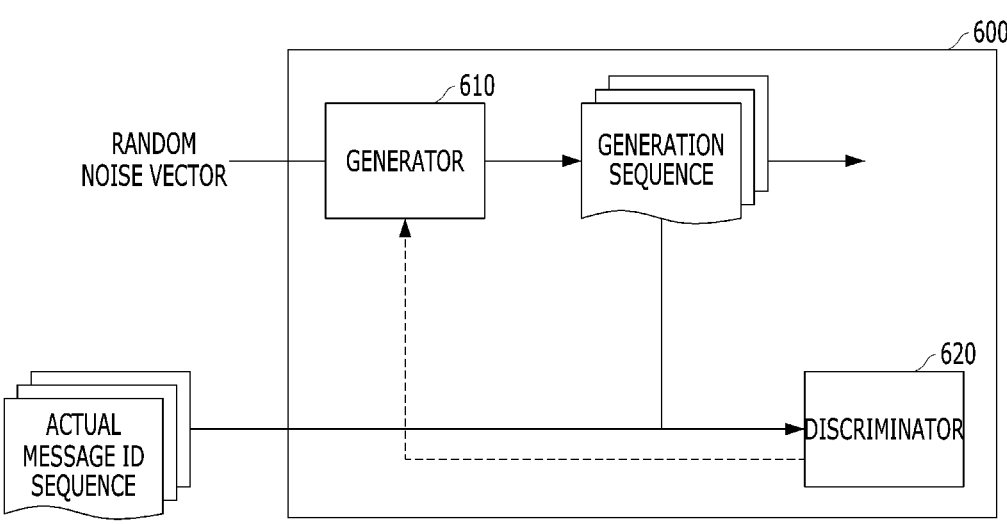
FIG. 6 is a block diagram for describing the first neural network model according to an exemplary embodiment of the present disclosure.

FIG. 6 is a block diagram for describing the first neural network model according to an exemplary embodiment of the present disclosure.

As illustrated in FIG. 6, the first neural network model 600 as the generative adversarial neural network model may have the structure of the generative adversarial network (GAN) in the deep learning field, and generate new data by training the data of which pre-processing in the pre-processing unit 300 is completed. The generator 610 of the first neural network model 600 may generate a generation sequence similar to an actual message ID sequence by receiving a random noise vector as an input. In this case, the random noise vector may be arbitrarily extracted from an equal distribution or a Gaussian distribution. In order to generate sequence data, the generator 610 may include network layers such as LSTM, GRU, 1D-Convolution, etc. The discriminator 620 of the first neural network model 600 may receive the actual message ID sequence and the generation sequence as the input and determine which sequence corresponds to the actual message ID sequence or which sequence corresponds to the generation sequence. A determination result may be delivered to the generator 610 by backpropagation and used for training the generator 610.

Subsequently, the training model 700 as a model that evaluates the first neural network model 600 which is the generative adversarial neural network model may train and evaluate the first neural network model 600 which is the generative adversarial neural network model by using the language model 500 which is the message ID N-gram model. Here, the first neural network model 600 and the training model 700 alternately operate to enhance the performance of the first neural network model 600 which is the generative adversarial neural network model.

The training model 700 may evaluate the first neural network model 600 by using the N-gram model generated in the language model 500 and train the first neural network model 600 based on an evaluation result. Here, the first neural network model 600 and the training model 700 may alternately perform the operations.

Figure 7:
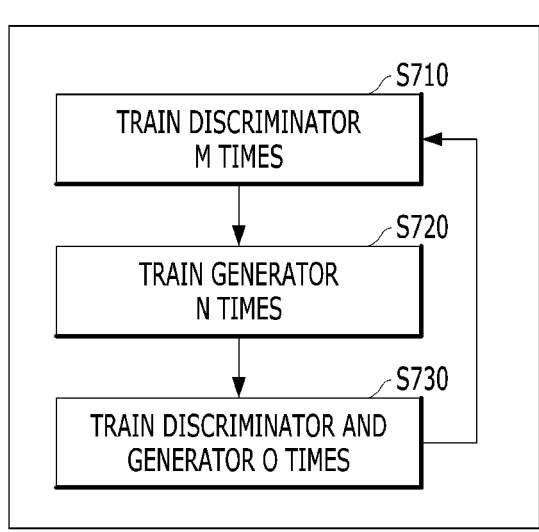
FIG. 7 is a flowchart illustrating a method for training a first neural network model according to an exemplary embodiment of the present disclosure.

FIG. 7 is a flowchart illustrating a method for training a first neural network model according to an exemplary embodiment of the present disclosure.

As illustrated in FIG. 7, the training method of the first neural network model which is the generative adversarial neural network model may be used in the training model 700 that evaluates the first neural network model. The first neural network model 600 may individually train each of the generator 610 and the discriminator 620, and since the training degree of the generator 610 and the training degree of the discriminator 620 are different, it is necessary to adjust training ratios thereof.

As an example, as illustrated in FIG. 7, first, the discriminator 620 may be trained M times (S710). Here, the discriminator 620 may be trained so as to discriminate the actual message ID sequence and the generation sequence, and a determination result may be used for the training.

Subsequently, the generator 610 may be trained N times (S720). In the present disclosure, a step of individually training only the generator 610 may be separately set, and a loss function for training the generator may be defined. An example of the loss function will be described below.

Next, the discriminator 620 and the generator 610 may be jointly trained O times (S730). Here, the determination result of the discriminator 620 may be delivered to the discriminator 620 and the generator 610 through the backpropagation and used for the training.

FIG. 7 is an example of the present disclosure, and training is performed in order of a discriminator training step, a generator training step, and a discriminator and generator training step, but the training order may not be fixed, but changed according to an applied environment. Further, the number of times of each training may also be adjusted.

Next, an example of a generator loss function is shown in Equation 1 below. Here, the generator loss function is not limited to Equation 1 below, but is just an example of the function, and the definition of the loss function may be changed to any degree.

(Generator Loss) = [Equation 1]

$$\frac{1}{N}\sum_{i=1}^{N}\sum_{j=1}^{\omega} m_{ij} \times \left[ a\log\frac{1}{Pr(m_{ij}|m_{i1}m_{i2},\ \dots\ ,m_{ij-1})} + \right.$$

$$\left. (1-a)p(m_{ij})\log\frac{p(m_{ij})}{q(m_{ij})} \right]$$

N represents a layout size, $\omega$ represents a sequence length, represents a j-th message ID of an i-th sequence, $Pr(m_{ij}|m_{i1}m_{i2},\ \dots\ ,m_{ij-1})$ represents a probability that $m_{ij}$ will appear when sequence $m_{i1}m_{i2},\dots,m_{ij-1}$ is given, $p(m_{ij})$ represents a probability that $m_{ij}$ will appear, $q(m_{ij})$ represents a ratio of $m_{ij}$ a which exists in an entire layout, and $\alpha$ represents a real number value between 0 and 1 ($\alpha\in[0,1]$).

The example is a loss function to train a ratio of the generated message ID and an order of the generated message ID. Besides, the loss function is defined by another scheme to efficiently train the generator.

The message ID N-gram model which is the language model may be utilized for the definition of the loss function or the calculation of the loss function.

According to the present disclosure, when the first neural network model 600 is trained, the discriminator and the generator of the first neural network model 600 are individually trained, and both the discriminator and the generator are trained to adjust a training ratio. The present disclosure may include a first training process of training only the discriminator M times, a second training process of training only the generator N times, and a third training process of training the discriminator and the generator O times, when training the first neural network model 600, and order and the number of times of the first, second, and third training processes may be varied based on a loss function of the generator.

In addition, the anomaly detecting unit 400 including the second neural network model receives the actual message ID sequence output by the pre-processing unit 300 and the generation message ID sequence output by the first neural network model 600 may train the second neural network model which is the anomaly detection model.

Figure 8:
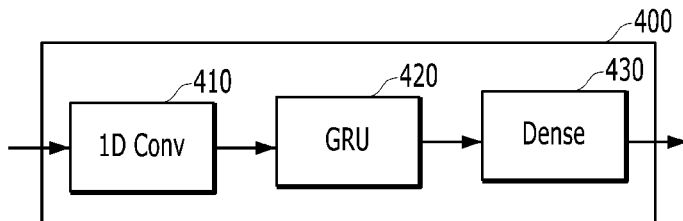
FIG. 8 is a block diagram for describing a second neural network model according to an exemplary embodiment of the present disclosure.

FIG. 8 is a block diagram for describing a second neural network model according to an exemplary embodiment of the present disclosure.

As illustrated in FIG. 8, the second neural network model which is the anomaly detection model may be a deep learning model that detects whether the anomaly occurs by receiving the preprocessed message ID sequence. As an example, the second neural network model of the anomaly detecting unit 400 may include a hierarchical structure including a 1D convolutional layer 410, a gated recurrent units (GRU) layer 420, and a dense layer 430. The above-described matter is just an example and the present disclosure is not limited thereto. If the hierarchical structure of the neural network model may perform a function to predict the message ID by receiving the message ID sequence, the hierarchical structure of the neural network model may be changed at any degree within the range in which the function is maintained.

The anomaly detecting unit 400 may train a message ID pattern transmitted and received in a normal state. That is, when a message ID sequence having a predetermined length is input, the anomaly detecting unit 400 may train the message ID pattern to predict a message ID to appear immediately subsequent to the corresponding sequence. If an attack on the unmanned moving body occurs, the transmitted and received message ID pattern will be different from a normal pattern, and in this case, a pre-trained anomaly detecting unit 400 has a prediction rate which is still lower than that in a general normal state. An indicator for determining whether the anomaly occurs may be an average of a prediction success rate or an average of a loss value for a predetermined time.

For example, the average of the loss value may be calculated as in Equation 2 below. Here, the frame means a time unit of receiving one message.

$$\left(\text{Average of loss value for } N \text{ frames} = \qquad \text{[Equation 2]}\right.$$
$$\left.\frac{Loss_\tau - Loss_{\tau-1} + \sim Loss_{\tau-N+1}}{N}\right)$$

Accordingly, the pre-trained anomaly detecting unit 400 may determine that the symptom is detected when the average of the prediction success rate is lower than a threshold or the average of the loss value is higher than a threshold. In this case, since the threshold may significantly vary depending on the structure of the anomaly detection model or an environment to which the detection model is applied, the threshold should be determined through an experiment.

As an exemplary embodiment, the anomaly detecting unit 400 may input the preprocessed packet data into the pre-trained second neural network model, predict a message ID following the current message ID sequence of the packet data input into the second neural network model, calculate a message ID pattern prediction success rate by comparing the predicted message ID and an actual message ID, and detect the symptom of the unmanned moving object based on the calculated message ID pattern prediction success rate.

The anomaly detecting unit 400 may calculate an average value for message ID pattern prediction success rates for a predetermined time when the message ID pattern prediction success rate is calculated, and detect the symptom of the unmanned moving object by comparing the calculated average value for the message ID pattern prediction success rates and a predetermined threshold. Here, the anomaly detecting unit 400 may determine that the symptom of the unmanned moving object is detected when the calculated average value for the message ID pattern prediction success rates is smaller than the threshold. As an example, the threshold may be varied according to the structure of the neural network model or an application environment of the neural network model, and determined through the experiment. The above-described matter is just an example and the present disclosure is not limited thereto.

As another exemplary embodiment, the anomaly detecting unit 400 may input the preprocessed packet data into the pre-trained second neural network model, predict a message ID following the current message ID sequence of the packet data input into the second neural network model, calculate a message ID pattern loss value by comparing the predicted message ID and an actual message ID, and detect the symptom of the unmanned moving object based on the calculated message ID pattern loss value.

The anomaly detecting unit 400 may calculate an average value for message ID pattern loss values for a predetermined time when the message ID pattern loss value is calculated, and detect the symptom of the unmanned moving object by comparing the calculated average value for the message ID pattern loss values and a predetermined threshold. Here, the anomaly detecting unit 400 may determine that the symptom of the unmanned moving object is detected when the calculated average value for the message ID pattern loss values is larger than the threshold. As an example, the threshold may be varied according to the structure of the neural network model or an application environment of the neural network model, and determined through the experiment. Further, the average value for the message ID pattern loss values for the predetermined time may be calculated by an equation configured by an average of loss values for N frames=$(Loss_\tau + Loss_{\tau-1} + \ldots Loss_{\tau-N+1})/N$. The above-described matter is just an example and the present disclosure is not limited thereto.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of the output node may be determined based on data input in the input node. Here, a node connecting the input node and the output node to each other may have a parameter. The parameter may be variable and the weight is variable by a user or an algorithm in order for the neural network to perform the desired function. For example, when one or more input nodes are mutually connected to one output node by the respective links, the output node may determine an output node value based on values input in the input nodes connected with the output node and the parameters set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the parameters assigned to the respective links in the neural network. For example, when the same number of nodes and links exist and there are two neural networks in which the parameter values of the links are different from each other, it may be recognized that two neural networks are different from each other.

The neural network may be configured to include one or more nodes. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, the definition of the layer is predetermined for description and the order of the layer in the neural network may be defined by a method different from the aforementioned method. For example, the layers of the nodes may be defined by the distance from the final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node. In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an autoencoder, generative adversarial networks (GAN), a restricted Boltzmann machine (RBM), a deep belief network (DBN), a Q network, a U network, a Siam network, and the like. The description of the deep neural network described above is just an example and the present disclosure is not limited thereto.

Figure 9:
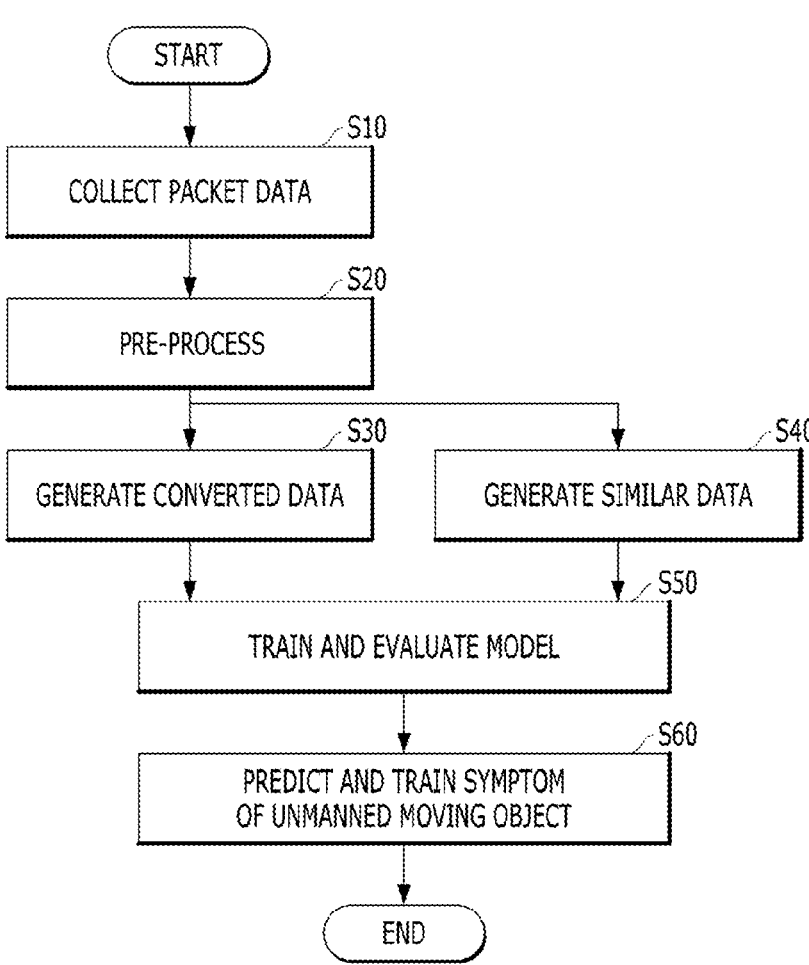
FIG. 9 is a flowchart for describing a method for training an anomaly detection model on unmanned moving objects according to an exemplary embodiment of the present disclosure.

FIG. 9 is a flowchart for describing a method for training an anomaly detection model on unmanned moving objects according to an exemplary embodiment of the present disclosure.

As illustrated in FIG. 9, a computing device according to the present disclosure may collect packet data generated from an unmanned moving object (S10). Here, the computing device collects the packet data generated from the unmanned moving object for communication between the unmanned moving object and a ground control system (GCS). For example, the unmanned moving object and a ground control system (GCS) may perform the communication by using a Micro Air Vehicle (MAV) Link protocol.

In addition, the computing device according to the present disclosure may preprocess the collected packet data (S20). Here, the computing device may extract a message ID from the collected packet data, assign an integer value to the extracted message ID, and normalize the integer value assigned to the message ID.

The computing device may extract only the message ID from the collected packet data when extracting the message ID. As an example, the extracted message ID may include an identifier for determining the type of message transmitted and received in a protocol which the unmanned moving object uses for the communication. Further, the computing device may assign the same integer value to the same message ID and assign different integer values to different message IDs, respectively, when assigning the integer value to the extracted message ID. Here, the computing device may assign different integer values according to the type of message ID when assigning the integer value to the extracted message ID. For example, when assigning the integer value to the extracted message ID, the processor 110 may assign any one integer among 1 to N to each message ID when the total number of types of message ID is N. Further, the computing device may normalize the integer value assigned to the message ID to scale the message ID to a range of 0 to 1, when normalizing the integer value assigned to the message ID. For example, when the total number of types of message ID is n, the computing device may normalize the integer value assigned to the message ID to a result value calculated by dividing the integer value assigned to each message ID by n.

Subsequently, the computing device may generate converted data for the message ID sequence of the packet data by inputting the preprocessed packet data into the language model (S30). When generating the converted data, the computing device divides the message ID sequence of the packet data into N units and sequentially performs an N-gram calculation for the divided sequence to generate the converted data for the message ID sequence. When the computing device generates the converted data, the language model may include a message ID N-gram model, and the computing device divides the message ID sequence of the packet data into N units through the message ID N-gram model and models the divided message ID sequences statistically and probabilistically to generate the converted data for the message ID sequence. For example, the language model may be the message ID N-gram model.

Next, the computing device may generate similar data similar to the message ID sequence of the packet data by inputting the preprocessed packet data into the first neural network model (S40). When generating the similar data, the computing device may generate a similar message ID sequence similar to the message ID sequence of the packet data by inputting a random noise vector into a generator of the first neural network model, train a discriminator so as to determine an actual message ID sequence and a similar message ID sequence by inputting the actual message ID sequence of the preprocessed packet data and the generated similar message ID sequence into the discriminator of the first neural network model, and train the generator by inputting a determination result into the generator of the first neural network model. As an example, the first neural network model may include a generative adversarial network (GAN) model.

The computing device may train and evaluate the first neural network model by inputting the converted data of the language model and the similar data of the first neural network model into a training model (S50). The computing device may evaluate the first neural network model by inputting the converted data of the language model and the similar data of the first neural network model into the training model, and train the first neural network model based on an evaluation result, when training and evaluating the first neural network model. Here, the first neural network model and the training model may alternately perform the operations. Further, when training the first neural network model, the computing device individually trains the discriminator and the generator of the first neural network model, and trains both the discriminator and the generator to adjust a training ratio. The computing device may include a first training process of training only the discriminator M times, a second training process of training only the generator N times, and a third training process of training the discriminator and the generator O times, when training the first neural network model, and order and the number of times of the first, second, and third training processes may be varied based on a loss function of the generator. For example, the computing device may train the discriminator of the first neural network model M times, train the generator of the first neural network model N times, and train the discriminator and the generator of the first neural network model O times, when training the first neural network model.

Subsequently, the computing device may predict and train the symptom of the unmanned moving object by inputting the preprocessed packet data and the similar data of the first neural network model into the second neural network model. The computing device may preprocess normal packet data generated when the unmanned moving object is in a normal communication state, and predict and train a message ID following a current message ID sequence of the normal packet data by inputting the preprocessed normal packet data into the second neural network model, when predicting and training the symptom of the unmanned moving object. Further, the computing device may input the preprocessed packet data into the pre-trained second neural network model, predict a message ID following the current message ID sequence of the packet data input into the second neural network model, calculate a message ID pattern prediction success rate by comparing the predicted message ID and an actual message ID, and detect the symptom of the unmanned moving object based on the calculated message ID pattern prediction success rate, when detecting the symptom of the unmanned moving object. As an example, the computing device may calculate an average value for message ID pattern prediction success rates for a predetermined time when the message ID pattern prediction success rate is calculated at the time of calculating the message ID pattern prediction success rate, and detect the symptom of the unmanned moving object by comparing the calculated average value for the message ID pattern prediction success rates and a predetermined threshold. As another example, the computing device may input the preprocessed packet data into the pre-trained second neural network model, predict a message ID following the current message ID sequence of the packet data input into the second neural network model, calculate a message ID pattern loss value by comparing the predicted message ID and an actual message ID, and detect the symptom of the unmanned moving object based on the calculated message ID pattern loss value, when detecting the symptom of the unmanned moving object. Here, the computing device may calculate an average value for message ID pattern loss values for a predetermined time when the message ID pattern loss value is calculated at the time of calculating the message ID pattern loss value, and detect the symptom of the unmanned moving object by comparing the calculated average value for the message ID pattern loss values and a predetermined threshold.

As described above, according to the present disclosure, data having a data pattern shown in the message ID sequence and various other patterns is generated, and the generated data is used for training to enhance the performance of an anomaly detection model.

Figure 10:
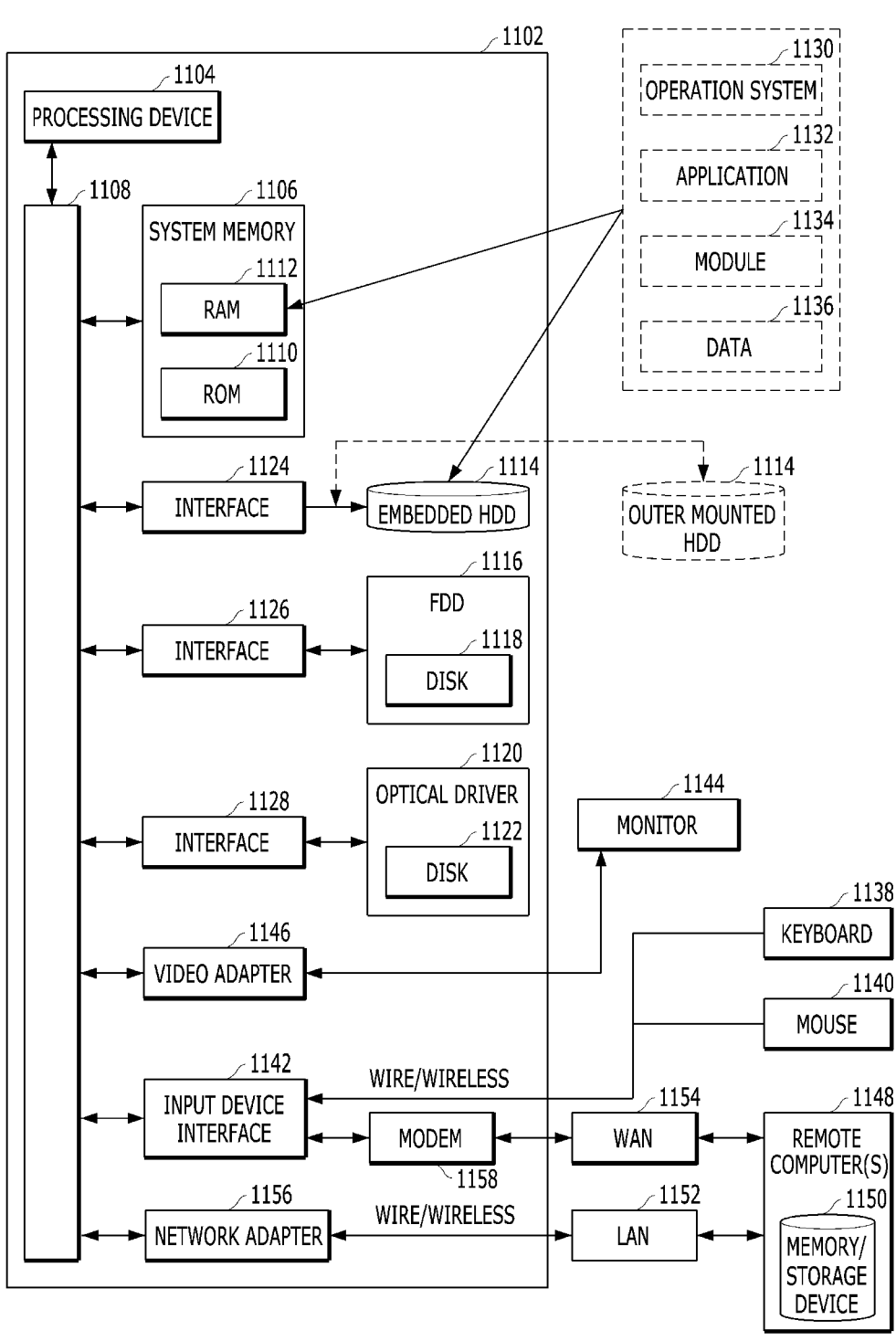
FIG. 10 is a general schematic view for an exemplary computing environment in which exemplary embodiments of the present disclosure may be implemented.

FIG. 10 is a general schematic view for an exemplary computing environment in which exemplary embodiments of the present disclosure may be implemented.

Although the present disclosure has been described generally in connection with the computer executable instructions that may be executed on one or more computers, those skilled in the art will appreciate that the present disclosure may be implemented through a combination of other program modules of the present disclosure and/or a combination of hardware and software.

In general, a module in the present specification includes a routine, a procedure, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. The computer readable medium includes volatile and non-volatile media, transitory and non-non-transitory media, and portable and non-portable media. As a non-limited example, the computer readable medium may include a computer readable storage medium and a computer readable transmission medium.

The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multiprocessor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a server computer, a router, a personal computer, a portable computer, a micro-processor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. A term "machine-readable medium" includes a wireless channel and various other media, which are capable of storing, holding, and/or transporting a command(s) and/or data, but is not limited thereto.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be interpreted within the widest range which is coherent with the principles and new features presented herein.

What is claimed is:

1. A method for training an anomaly detection model of an unmanned moving object, the method comprising:
   collecting packet data generated from the unmanned moving object;
   pre-processing the collected packet data;
   generating a second message identification ("ID") sequence having a message ID pattern corresponding to a first message ID sequence of the packet data by inputting the pre-processed packet data to a language model to produce converted data for the first message ID sequence;
   generating a third message ID sequence having statistical characteristics corresponding to the first message ID sequence of the packet data by inputting the pre-processed packet data to a first neural network model to produce a fourth message ID sequence;
   training and evaluating the first neural network model by inputting the converted data of the language model and the fourth message ID sequence of the first neural network model to a training model; and training a second neural network model in a way of predicting a symptom of the unmanned moving object, the training comprising:

pre-processing packet data generated in a communication state of the unmanned moving object; and training the second neural network model to predict a message ID following a current message ID sequence of the packet data by inputting the pre-processed packet data to the second neural network model.

2. The method of claim 1, wherein the pre-processing of the collected packet data includes:

extracting a message ID from the collected packet data;

assigning an integer value to the extracted message ID; and normalizing the integer value assigned to the message ID.

3. The method of claim 2, wherein the assigning an integer value to the extracted message ID includes assigning a different integer value according to a type of the message ID.

4. The method of claim 3, wherein the normalizing the integer value assigned to the message ID includes normalizing the integer value assigned to the message ID to a range of 0 to 1 in order to scale a size of the message ID.

5. The method of claim 1, wherein the generating of the converted data includes dividing the first message ID sequence of the packet data into N units, and generating the converted data for the first message ID sequence by sequentially performing an N-gram calculation for the divided sequence.

6. The method of claim 1, wherein the language model includes a message ID N-gram model.

7. The method of claim 1, wherein the generating the fourth message ID sequence includes:

generating the third message ID sequence having statistical characteristics corresponding to the first message ID sequence of the packet data by inputting a random noise vector to a generator of the first neural network model:

training to discriminate between an actual message ID sequence and the third message ID sequence by inputting the actual message ID sequence of the pre-processed packet data and the generated third message ID sequence to a discriminator of the first neural network model; and training the generator by inputting determination result to the generator of the first neural network model.

8. The method of claim 1, wherein the first neural network model includes a generative adversarial network (GAN) model.

9. The method of claim 1, wherein the training and evaluating the first neural network model includes:

evaluating the first neural network model by inputting the converted data of the language model and the fourth message ID sequence of the first neural network model in a training model; and training the first neural network model based on evaluation result.

10. The method of claim 7, wherein the training the first neural network model includes training the discriminator and the generator of the first neural network model individually, and then training both the discriminator and the generator to adjust a training ratio.

11. The method of claim 10, wherein the training the first neural network model includes a first training process of training only the discriminator M times, wherein Mis a positive integer, a second training process of training only the generator N times, wherein N is a positive integer, and a third training process of training the discriminator and the generator O times, wherein O is a positive integer, and orders and the numbers of times of the first training process, the second training process, and the third training processes are varied based on a loss function of the generator.

12. The method of claim 9, wherein the training the first neural network model includes:

training the discriminator of the first neural network model M times, wherein M is a positive integer;

training the generator of the first neural network model N times, wherein N is a positive integer; and training the discriminator and the generator of the first neural network model O times, wherein O is a positive integer.

13. A non-transitory computer readable medium storing a computer program, wherein the computer program performs the following method for training an anomaly detection model of an unmanned moving object when executed by one or more processors, the method comprising:

collecting packet data generated from the unmanned moving object;

pre-processing the collected packet data;

generating a second message identification ("ID") sequence having a message ID pattern corresponding to a first message ID sequence of the packet data by inputting the pre-processed packet data to a language model to produce converted data for the first message ID sequence;

generating a third message ID sequence having statistical characteristics corresponding to the first message ID sequence of the packet data by inputting the pre-processed packet data to a first neural network model to produce a fourth message ID sequence;

training and evaluating the first neural network model by inputting the converted data of the language model and the fourth message ID sequence of the first neural network model to a training model; and training a second neural network model in a way of predicting a symptom of the unmanned moving object, the training comprising:

pre-processing packet data generated in a communication state of the unmanned moving object; and training the second neural network model to predict a message ID following a current message ID sequence of the packet data by inputting the pre-processed packet data to the second neural network model.

14. A computing device for providing a method of training an anomaly detection model of an unmanned moving object, the computing device comprising a processor including one or more cores; and a memory, wherein the processor is configured to:

collect packet data generated from the unmanned moving object;

preprocess the collected packet data;

generate a second message identification ("ID") sequence having a message ID pattern corresponding to a first message ID sequence of the packet data by inputting the pre-processed packet data to a language model to produce converted data for the first message ID sequence;

generate a third message ID sequence having statistical characteristics corresponding to the first message ID sequence of the packet data by inputting the preprocessed packet data to a first neural network model to produce a fourth message ID sequence;

train and evaluate the first neural network model by inputting the converted data of the language model and the fourth message ID sequence of the first neural network model to a training model; and train a second neural network model in a way of predicting a symptom of the unmanned moving object, the training comprising:

pre-processing packet data generated in a communication state of the unmanned moving object; and training the second neural network model to predict a message ID following a current message ID sequence of the packet data by inputting the pre-processed packet data to the second neural network model.

* * * * *